United States Patent
Carlson et al.

(10) Patent No.: US 6,340,271 B1
(45) Date of Patent: Jan. 22, 2002

(54) CONDUIT CABLE FEEDING SHEAVE

(75) Inventors: Derek Carlson, Hooper; Kenn Dayton, Salt Lake City; Russ Vance, West Jordan; George Vent, Sandy, all of UT (US)

(73) Assignee: Wireline Technologies, Inc., North Salt Lake, UT (US)

( * ) Notice: Subject to any disclaimer, the term of this patent is extended or adjusted under 35 U.S.C. 154(b) by 0 days.

(21) Appl. No.: 09/513,159

(22) Filed: Feb. 25, 2000

Related U.S. Application Data

(60) Provisional application No. 60/122,154, filed on Feb. 26, 1999.

(51) Int. Cl.[7] ................................................. F16L 3/00
(52) U.S. Cl. .......................... 405/184.4; 405/183.5; 254/390
(58) Field of Search .................... 405/154.1, 157, 405/183.5, 184, 184.1, 184.2, 184.4; 254/390, 413, 374, 134.35 C, 134.3 FT, 134.3 R, 415; 226/194; 242/615.2

(56) References Cited

U.S. PATENT DOCUMENTS

| | | | | |
|---|---|---|---|---|
| 2,654,571 A | * | 10/1953 | Albright, Jr. | 254/415 |
| 4,057,211 A | * | 11/1977 | Moore | 254/156 |
| 4,151,903 A | * | 5/1979 | Martino | 254/134.3 R |
| 4,309,128 A | * | 1/1982 | Williams | 405/184.3 |
| 4,685,831 A | * | 8/1987 | Mahoney | 405/156 |
| 5,236,177 A | * | 8/1993 | Tamm | 254/134.3 FT |
| 5,328,297 A | * | 7/1994 | Handford | 405/184 |
| 5,735,505 A | * | 4/1998 | Walton | 254/134.3 PA |
| 6,138,992 A | * | 10/2000 | Bell | 254/413 |

OTHER PUBLICATIONS

Evans, Charles M., "Distribution Conductor Stringing Equipment and Techniques for the Nineties", Sherman & Reilly, Inc., pp. 1–6 (1996).
On–line publication of Cable Feeding Sheaves (undated).

* cited by examiner

*Primary Examiner*—David Bagnell
*Assistant Examiner*—Frederick L. Lagman
(74) *Attorney, Agent, or Firm*—Madson & Metcalf

(57) ABSTRACT

A conduit cable feeding sheave assembly is disclosed having a frame structure, an axle assembly disposed within the frame structure, and a sheave wheel disposed about the axle assembly. In one embodiment, the sheave wheel is fabricated of a self-lubricating, durable polymeric material. A slotted, tubular arm affixed to the frame extends along a line substantially tangential to the wheel. The arm has an exterior diameter sized to fit within a conventional conduit pipe, preferably having a diameter ranging from 2 to 10 inches. In one preferred embodiment, the tubular arm has at least one locking mechanism for temporarily securing the conduit sheave assembly within the conduit pipe. One disclosed locking mechanism is a threaded screw that extends from the interior of the tubular arm to engage the conduit.

18 Claims, 3 Drawing Sheets

CONDUIT CABLE FEEDING SHEAVE

This application claims benefit of No. 60/122,154 filed Feb. 26, 1999.

FIELD OF THE INVENTION

The present invention relates stringing cable through conduits, more particularly, the present invention relates to a cable feeding sheave assembly for installing cable within conduits.

BACKGROUND OF THE INVENTION

Conduit sheaves are devices used to install cable within underground conduits, such as those accessed within manholes and commercial buildings. Conduit sheaves are sized to fit within the conduit. Commercially available conduit sheaves use aluminum sheave wheels. These aluminum wheels tend to wear out quickly and damage the conductor cable being installed.

A significant problem with conduit sheaves is that they do not provide a mechanism for securing the device within the conduit. While cable is being installed, tension holds the conduit sheave in place. However, when the cable becomes slack during installation, the conduit sheave can shift within the conduit or fall out of the conduit (particularly with an overhead conduit), causing potential damage to the cable, human injury, and delay in the installation process.

It would be a significant advancement in the art to provide a conduit sheave having a wheel which overcomes the problems with aluminum wheels described above. It would also be an advancement in the art to provide a conduit sheave which can be quickly, temporarily secured within the conduit.

SUMMARY OF THE INVENTION

The present invention is directed to a conduit cable feeding sheave assembly. The cable feeding sheave has a frame structure, an axle assembly disposed within the frame structure, and a sheave wheel disposed about the axle assembly. A slotted, tubular arm affixed to the frame extends along a line substantially tangential to the wheel. The arm has an exterior diameter sized to fit within a conventional conduit pipe. The typical conduit size ranges from about 2 to 10 inches, and more preferably between about 3 and 6 inches. The slotted, tubular arm facilitates loading and unloading the cable within the cable feeding sheave assembly.

In a presently preferred embodiment, the tubular arm has at least one locking mechanism for temporarily securing the conduit sheave assembly within the conduit pipe. One preferred locking mechanism is a threaded screw that extends through the interior of the tubular arm to engage the inside surface of the conduit. One or more screws can be used for this purpose. Examples of some possible alternative locking mechanisms that can be used include a lever actuated cam, a sliding wedge assembly, and a friction collar.

In a presently preferred embodiment, the sheave wheel is fabricated of a non-conducting, self-lubricating, durable polymeric material. In a preferred embodiment the polymeric material has a coefficient of friction less than 0.5. A variety of engineering plastics can be used, particularly those containing nylon. One currently preferred polymeric material is PA6-G-type nylon.

In a preferred embodiment, one or more handles are affixed to the frame structure to facilitate transport and positioning of the block assembly.

DETAILED DESCRIPTION OF THE INVENTION

Figure 1:
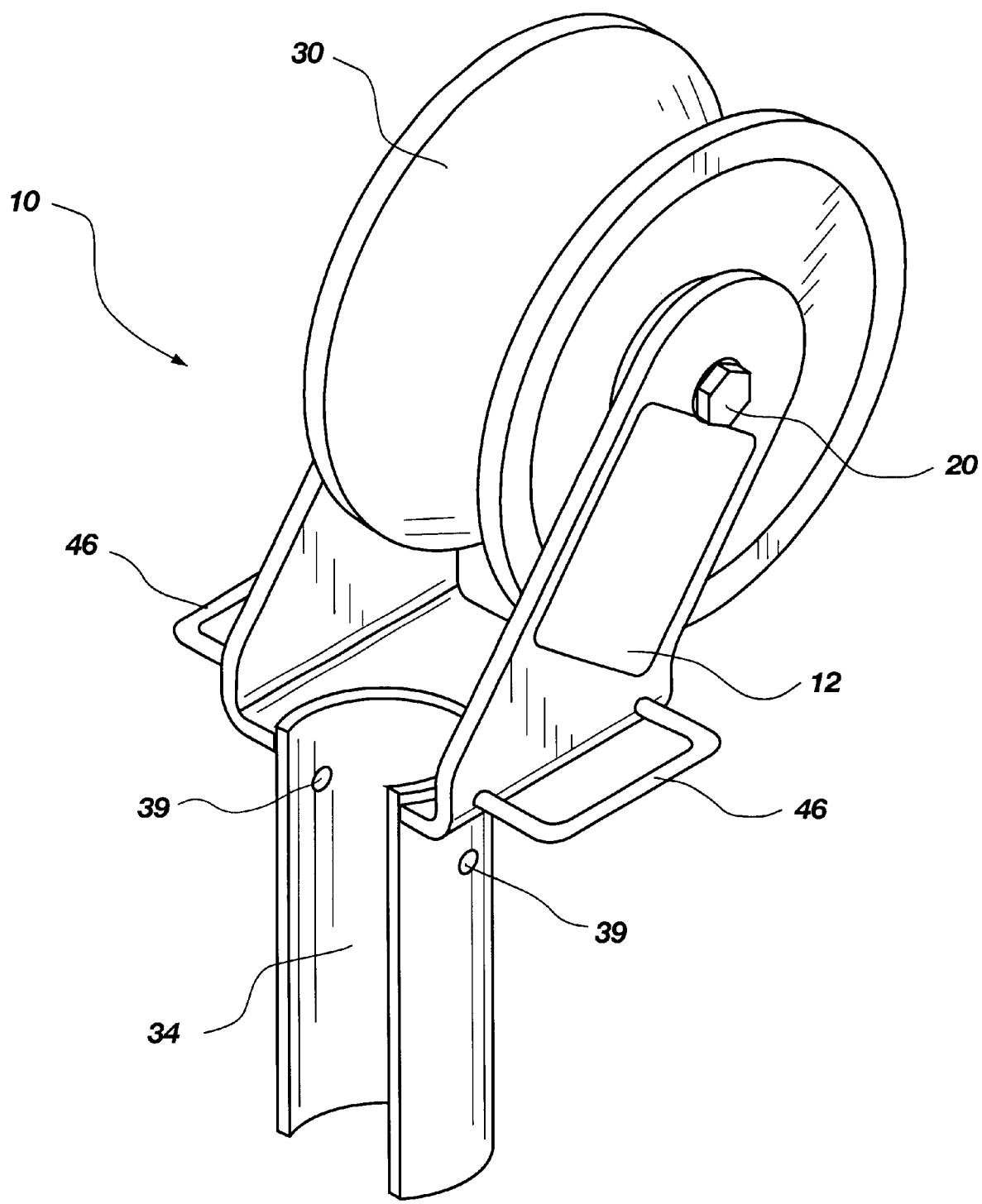
FIG. 1 is a perspective view of a conduit cable feeding sheave assembly within the scope of the present invention.
Figure 2:
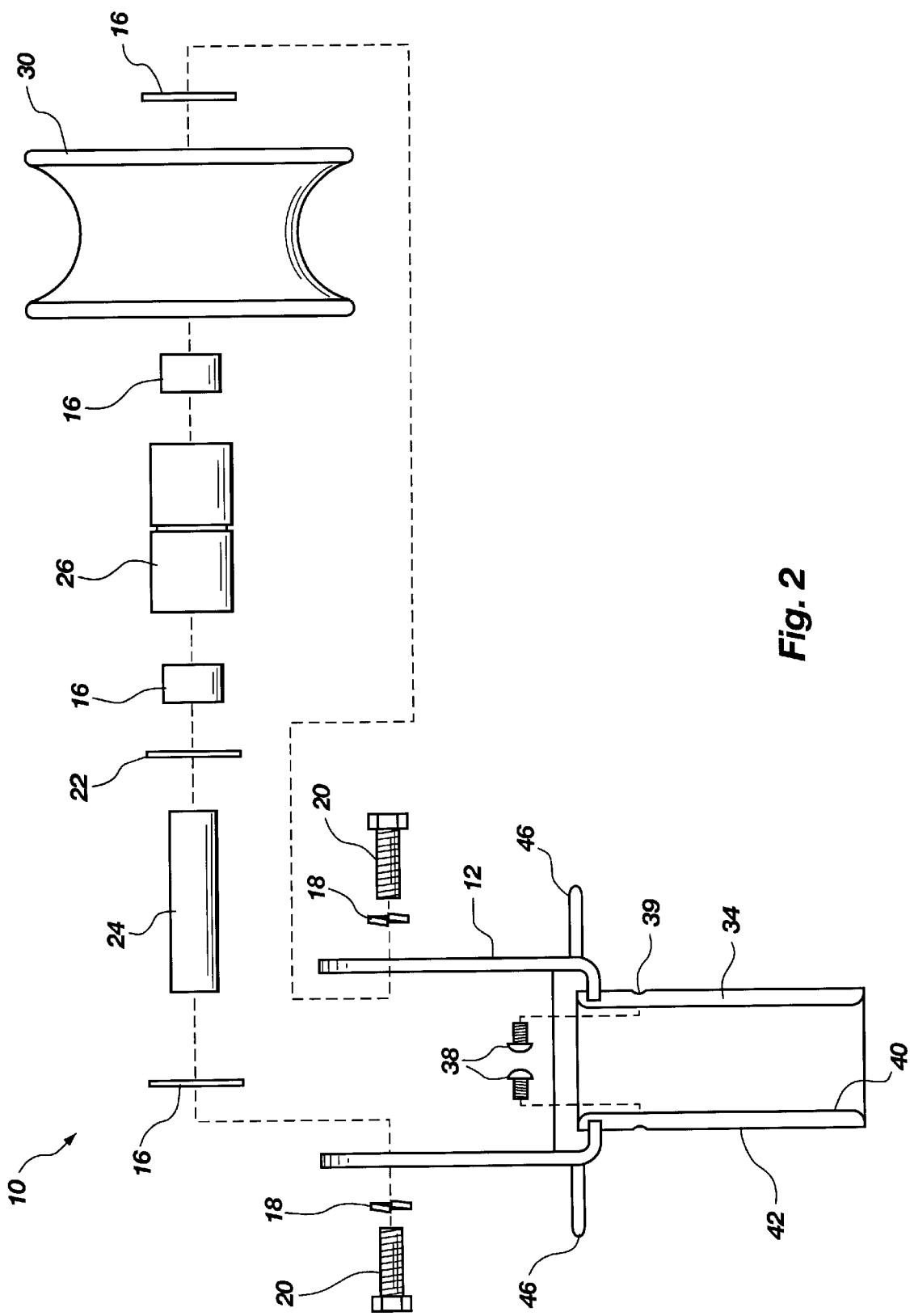
FIG. 2 is an exploded top view of the conduit cable feeding sheave assembly of FIG. 1.
Figure 3:
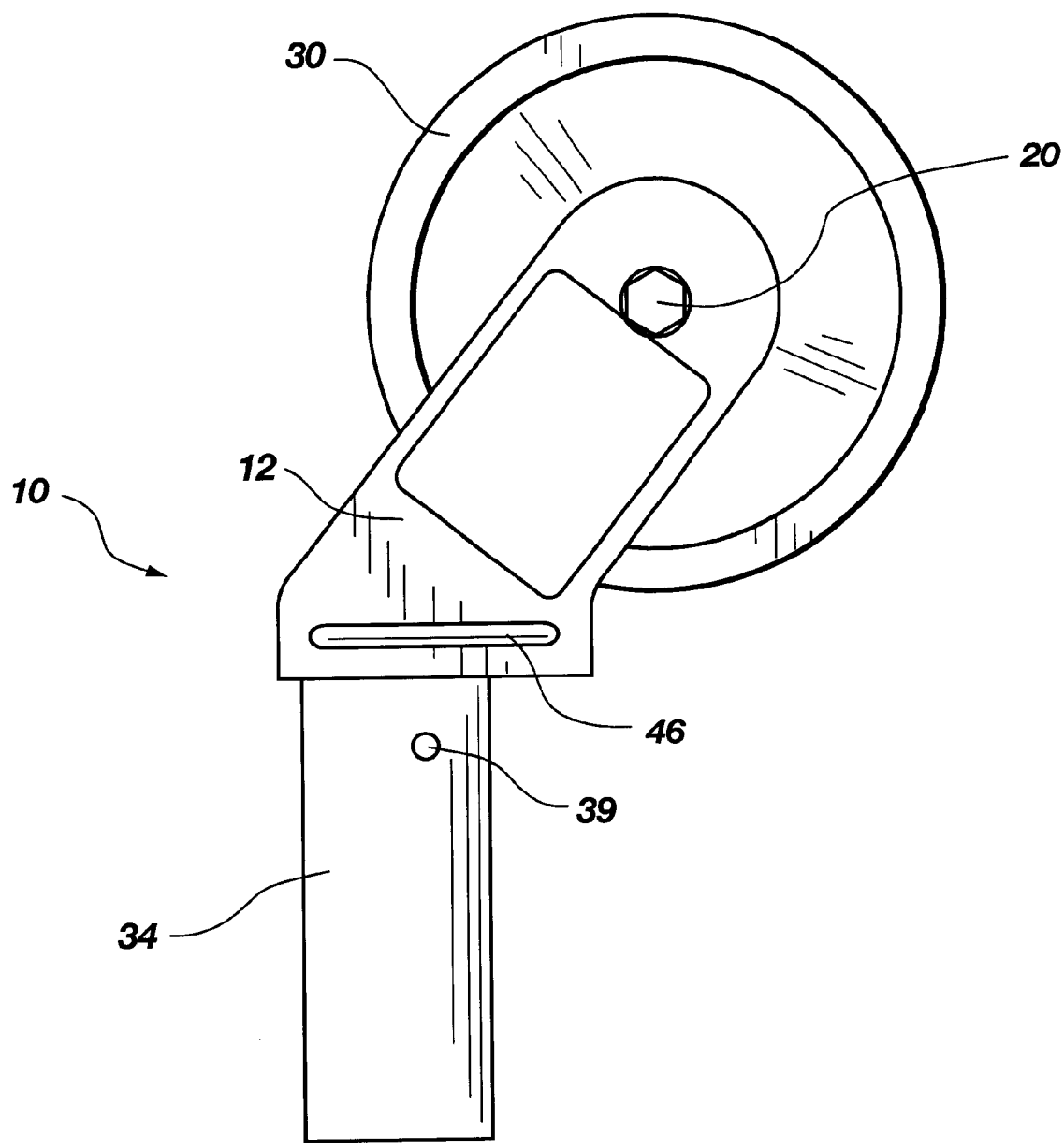
FIG. 3 is a side view of the assembly of FIG. 1.

Reference is now made to the figures. One configuration of the conduit sheave within the scope of the present invention is illustrated in FIGS. 1–3. The conduit sheave 10 includes a U-shaped frame structure 12.

The frame structure 12 includes an axle assembly disposed within the frame structure 12. The axle assembly preferably includes conventional bearings 16, washers 18, screws 20, retaining ring 22, axle 24, sleeve 26, and other parts commonly used to assemble an axle as shown in FIG. 2.

A sheave wheel 30 is mounted on the axle assembly. The wheel 30 is sized to fit over the axle assembly and frame 12. The wheel 30 may be manufactured with a variety of different known and novel materials. The wheel 30 is preferably fabricated of a durable, self lubricating polymeric material. Polymeric materials having a low coefficient of friction are preferred. The coefficient of friction is preferably less than 0.5 and more preferably in the range from 0.15 to 0.35. It has been found that wheels having a low coefficient of friction tend to last longer and cause less harm to the cable being installed than other comparable wheels.

The class of special high performance plastics, known as engineering plastics, are a currently preferred material used to manufacture the wheel 30. Many of these plastics contain nylon. Engineering plastics often include additives to improve properties of the polymeric material. As used in the present invention, the polymeric material preferably includes an additive to improve or lower the coefficient of friction. Molybdenum disulfide is one useful additive in the polymeric material. Another useful additive is oil. One currently preferred polymeric material is PA6-G-type nylon, manufactured by Timco.

A tubular arm 34 is affixed to the frame 12 extending along a line substantially tangential to the wheel 30. The arm 34 has a slot 36 extending along its length such that it has a C-shaped cross-section. The tubular arm 34 has an exterior diameter sized to fit within the conduit pipe. Typically, the conduit pipe would have an interior diameter ranging from about 2 to 6 inches.

An important feature of the present invention is at least one locking mechanism associated with the tubular arm 34 for temporarily securing or retaining the conduit sheave assembly within the conduit pipe. In one presently preferred embodiment, the locking mechanism comprises at least one threaded screw 38. The threaded screws 38 preferably pass through a hole 39 the tubular arm 34 from the interior surface 40 of the arm 34 to the exterior surface 42. The threaded screws 38 can be of the type which are actuated with an allen wrench from the inside of arm 34. If a specialized tool is required to actuate the screws, then the frame 12 can include means for retaining tool so that it is conveniently associated with the conduit sheave 10.

Other alternative locking mechanisms can be used, such as a lever actuated cam. Although not shown in the drawings, a lever actuated cam is configured to pivot about a pin within the tubular arm. A release arm attached to the cam can be pulled to engage the cam and pushed to release the cam. Teeth on the outside of the cam engage the conduit inside surface.

Another alternative locking mechanism is a sliding wedge configured to slide within an angled pocket cut in the outside of the tubular arm. The wedge has teeth to grip the conduit inside surface as it is pushed towards the conduit. The device can be released by pulling back on the wedge.

A friction collar can also be used as a locking mechanism. A friction collar functions by biasing the tubular arm within the conduit.

One or more handles 46 on frame 12 are provided to facilitate transport and positioning of cable feeding sheave assembly, particularly those sized for use in larger conduits.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The claimed invention is:

1. A conduit sheave assembly comprising:
   a frame structure;
   an axle assembly disposed within the frame structure;
   a sheave wheel sized to fit over the axle assembly, said wheel being fabricated of a durable polymeric material;
   a tubular arm affixed to the frame extending along a line substantially tangential to the wheel, wherein said arm has a slot extending along its length such that it has a C-shaped cross-section and wherein said arm has an exterior diameter sized to fit within a conduit pipe; and
   a locking mechanism associated with the tubular arm for temporarily securing the conduit sheave assembly within the conduit pipe.

2. A conduit sheave assembly according to claim 1, wherein the frame structure is U-shaped.

3. A conduit sheave assembly according to claim 1, wherein the conduit pipe has an interior diameter ranging from 2 to 10 inches.

4. A conduit sheave assembly according to claim 1, wherein the conduit pipe has an interior diameter ranging from 3 to 6 inches.

5. A conduit sheave assembly according to claim 1, wherein the locking mechanism comprises at least one threaded screw.

6. A conduit sheave assembly according to claim 5, wherein the tubular arm has an interior surface and an exterior surface and the at least one threaded screw passes through the tubular arm from interior surface to the exterior surface.

7. A conduit sheave assembly according to claim 1, wherein the polymeric material is self-lubricating.

8. A conduit sheave assembly according to claim 1, wherein the polymeric material comprises engineering plastics.

9. A conduit sheave assembly according to claim 1, wherein the polymeric material has a coefficient of friction less than 0.5.

10. A conduit sheave assembly according to claim 1, wherein the polymeric material has a coefficient of friction in the range from 0.15 to 0.35.

11. A conduit sheave assembly according to claim 1, wherein the polymeric material comprises nylon.

12. A conduit sheave assembly according to claim 1, wherein the polymeric material comprises PA6-G-type nylon.

13. A conduit sheave assembly comprising:
    a frame structure;
    an axle assembly disposed within the frame structure;
    a sheave wheel sized to fit over the axle assembly;
    a tubular arm affixed to the frame extending along a line substantially tangential to the wheel, wherein said arm has a slot extending along its length such that it has a C-shaped cross-section and wherein said arm has an exterior diameter sized to fit within a conduit pipe; and
    a locking mechanism associated with the tubular arm for temporarily securing the conduit sheave assembly within the conduit pipe.

14. A conduit sheave assembly according to claim 13, wherein the locking mechanism comprises at least one threaded screw.

15. A conduit sheave assembly according to claim 14, wherein the tubular arm has an interior surface and an exterior surface and the at least one threaded screw passes through the tubular arm from interior surface to the exterior surface.

16. A conduit sheave assembly according to claim 13, wherein the sheave wheel is made of a non-conductive polymeric material.

17. A conduit sheave assembly according to claim 16, wherein the polymeric material has a coefficient of friction less than 0.5.

18. A conduit sheave assembly comprising:
    a frame structure;
    an axle assembly disposed within the frame structure;
    a sheave wheel sized to fit over the axle assembly, said wheel being fabricated of a durable polymeric material;
    a tubular arm affixed to the frame extending along a line substantially tangential to the wheel, wherein said arm has a slot extending along its length such that it has a C-shaped cross-section and wherein said arm has an exterior diameter sized to fit within a conduit pipe; and
    a locking mechanism associated with the tubular arm for temporarily securing the conduit sheave assembly within the conduit pipe.

* * * * *